United States Patent Office 3,041,591
Patented June 26, 1962

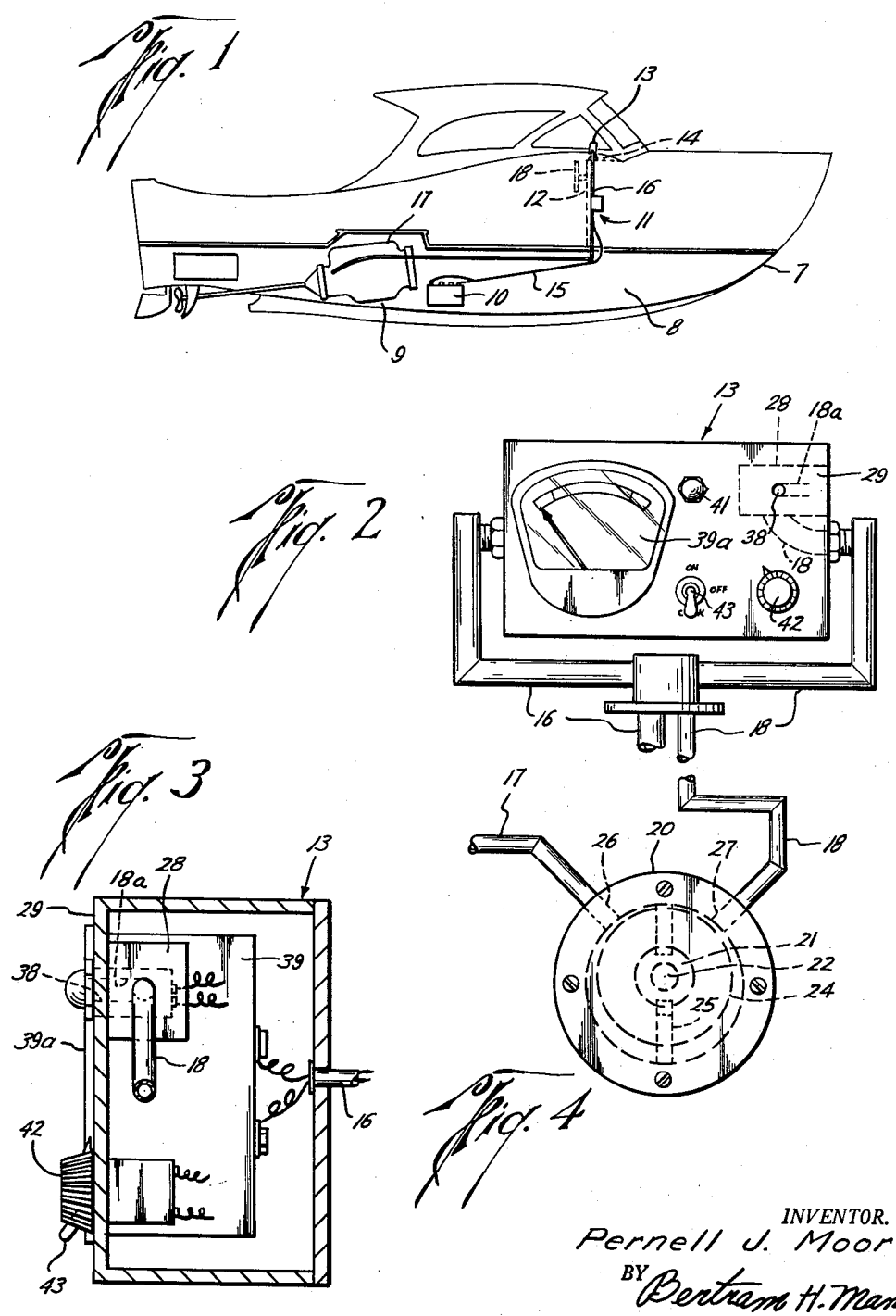

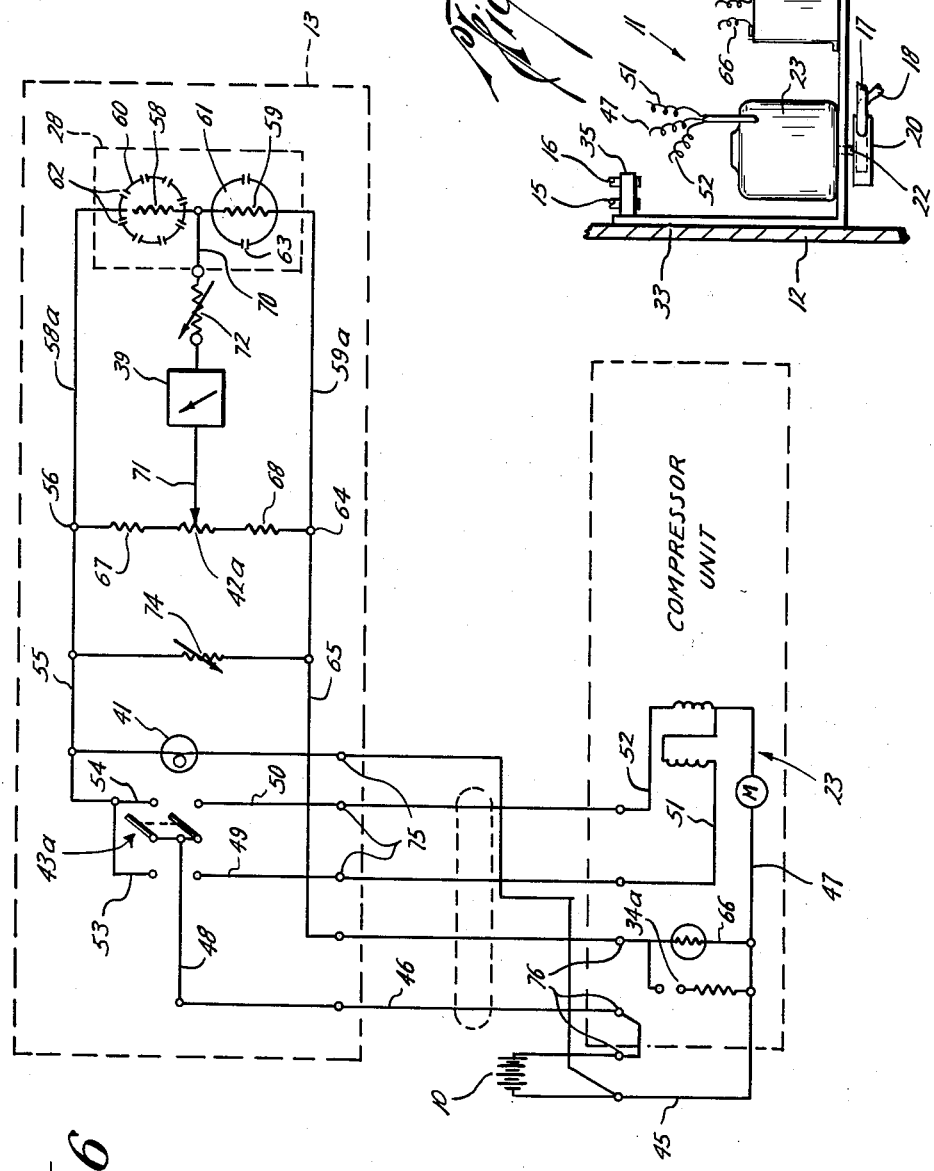

3,041,591
CONTAMINANT GAS DETECTOR
Pernell J. Moore, Houston, Tex., assignor to National Lead Company, New York, N.Y., a corporation of New Jersey
Filed Mar. 11, 1960, Ser. No. 14,237
3 Claims. (Cl. 340—237)

This invention relates to an apparatus for detecting the presence of combustible and/or other contaminant gases in spaces having relatively poor ventilation.

The accumulation of combustible and otherwise potentially dangerous vapors or gases in poorly ventilated spaces obviously presents a very serious threat to life and property which may be in or in close proximity to such spaces. Gasoline-powered pleasure boats, which are acquiring increased popularity, present a common example where the accumulation of undetected combustible gases may result in very serious accidents. Gasoline vapors or other combustible hydrocarbon vapors frequently accumulate in the bilges of power-driven boats as a result of leaking fuel lines or malfunctioning engines, and unless the presence of such gases is detected promptly, preferably before the engine is started, a serious fire or explosion may occur. When combustible gases are detected in dangerous concentrations, proper corrective steps can be taken to eliminate them from the bilges before starting the engine or creating other conditions that might cause a fire or explosion.

Various devices have been designed and used to detect the presence of combustible and other gases and vapors. These previously known devices usually function by introduction of a gas sensing unit bodily into the compartment that is to be monitored. The physical or electrical properties of one type of combustible gas sensing unit are normally changed by an increase in temperature resulting from what is intended to be a controlled combustion of a small sample of the vapor being tested. Other sensing units, such as those containing a thermal filament, take advantage of variations in the thermal conductivity of various gases.

Previously known gas detecting apparatuses have several rather obvious disadvantages when used to detect the presence of combustible vapors in the bilge of a boat. With the sensing unit in the compartment that is being monitored, there is the ever present danger that the unit might function improperly and cause an uncontrolled combustion of gases in the compartment. There is also a possibility that the unit may become water soaked if the bilge is flooded and thus will be at least temporarily and perhaps permanently useless, necessitating replacement. A still further disadvantage of the previously known apparatuses is that a plurality of sensing units are needed if two or more compartments are to be conveniently monitored.

By means of the present invention a safe and economical gas detecting apparatus is provided that overcomes the disadvantages of previously known apparatuses designed to monitor confined spaces for such gases.

It is therefore an object of this invention to provide a contaminant gas detecting apparatus that eliminates the necessity of having a sensing unit in the compartment that is being monitored.

Another object of this invention is to provide a gas dtecting apparatus for boats, the sensing unit of which is conveniently located where it is in little danger of becoming flooded.

Another object of this invention is to provide an apparatus that is capable of monitoring several compartments without the need for a plurality of sensing units.

A further object of this invention is to provide a simplified gas detecting apparatus, the sensing unit of which can be easily purged of any contaminating gases and exposed to known contaminants and/or fresh air, thus providing a means of checking the sensitivity of the sensing unit and, if necessary, adjusting the calibration of the indicating unit.

Briefly, the novel apparatus consists of a reversible gas pump connected by piping to the area or areas to be monitored and, serially, to the sensing unit and a combination exhaust and check or test port. Normally, part of the atmosphere being monitored is pumped to the sensing unit and thence out the exhaust. To check the zero setting, it is merely necessary to reverse the pump, which exposes the detector to pure air and flushes out the piping. Exposing the test port to fumes, as from an open cigarette lighter, will provide a test of the sensitivity of the sensing unit.

In the accompanying drawings—

FIG. 1 is a schematic side representation of an inboard motor launch with the invention applied thereto.

FIG. 2 is a front elevational view showing the instrument or control panel.

FIG. 3 is a side view of the instrument panel.

FIG. 4 is a schematic representation of the air pump.

FIG. 5 is a schematic side view of the air pump, motor, and voltage regulator with mounting.

FIG. 6 is a wiring diagram of the apparatus.

Referring now to FIG. 1, there is shown a boat hull 7 having a bilge 8 in which is mounted the engine 9 and storage battery 10. A reversible gas pump and motor unit, generally indicated at 11, is mounted behind dash panel 12, and the control or instrument housing 13 is mounted above cowl 14. Electrical cables 15, 16 connect the battery, the motor, and the instrument housing. One or more tubes 17, conveniently of flexible plastic, extend from one port of the air pump into the bilge space or spaces to be monitored. Tubing 18 connects the pump to the control housing.

FIGS. 2 and 3 and side views 4 and 5 show in somewhat greater detail the several elements of the apparatus. Casing 20 of the reversible air pump has a central bushing 21 in its inner wall (FIG. 4) which rotatably receives and rides on shaft 22 of motor 23. The portion of the motor shaft within the pump casing is rigidly secured to eccentric rotor 24 carrying centrifugally controlled vanes 25. One port 26 of the pump is connected to tubing 17 leading to the bilge compartment, while the other port 27 is connected to tubing 18 which leads to a sensing unit casing 28 mounted within housing 13 on back of control panel 29. Motor 23 is mounted on the horizontal leg 32 of an angular bracket, the vertical leg 33 of which is secured to the dash panel 12 or upon any convenient support. Also mounted on leg 32 of the bracket, as by contact prongs, is voltage regulator tube 34 for the sensing unit, to be referred to hereafter. A terminal board 35 projects from the upper edge of bracket leg 33. The bracket can be mounted in any position and on any convenient support. The wiring fragments leading from the motor and regulator tube, to be referred to hereafter, in practice are connected to the terminal board 35.

Leading from sensing unit casing 28 through the front of the control panel is the combination exhaust and check tube 18a and port 38. Also mounted on the control panel is a voltmeter 39 having a reading dial 39a, an indicator light 41, a detector calibrating control button 42, and a three-position switch button 43 for switch 43a (FIG. 6). The electrical wiring for parts 28, 29, 41 and 43 is omitted in FIG. 2, but is represented diagrammatically in FIG. 6. The wiring fragments shown in FIG. 3 leading from the instruments in practice will connect through a cable 16 with terminal board 35 of the motor pump unit.

With reference to FIG. 6, which is the wiring diagram, a 6 or 12 volt battery 10 is shown connected by wires 45 and 46, respectively, to one motor lead 47 and hot lead 48 of switch 43a. Two contact leads 49 and 50 of the switch connect with motor field leads 51 and 52. The switch is designed, when moved to its opposite extreme positions, to energize the motor for operation in opposite directions, while in the intermediate position of the switch, the motor is de-energized. The other switch contact leads 53 and 54 connect through a common wire 55 to a corner terminal 56 of a Wheatstone bridge circuit. The gas sensing unit, mounted in casing 28, has two matching catalytic filaments 58 and 59, forming with leads 58a and 59a two arms of the bridge. The filaments are mounted in individual casings 60 and 61. Casing 60 has a relatively large number of ports 62 connecting the interior of the casing with the ambient atmosphere within detector housing 28. Casing 61 has a relatively small number of ports 63. Thus, filament 59 serves as a compensator which is affected by gases or vapors other than combustible vapors, such as carbon monoxide and water vapor. On the other hand, filament 58 is affected by combustible vapors. Filament 59 is connected through the other corner terminal 64 of the bridge and wire 65 to voltage regulator 34a and thence by wires 66 and 45 to the battery for maintaining the filaments normally at a constant temperature and resistance. Additional balancing resistances 67 and 68 are connected between terminals 56 and 64 in parallel with filaments 58 and 59. Extending from the midpoint of the two filament arms and completing the bridge circuit is wiring 70, 71 including, in series, variable resistance 72 and voltmeter 39 and connected between resistance 67 and 68 by means of a variable resistance 42a. Variable resistance 72 is adjusted to bring the voltmeter on scale with the particular set of resistances used. Variable resistance 42a is controlled by calibrating button 42 on the control panel to zero the voltmeter needle. Indicator light 41 is in parallel with motor 23 and, therefore, is lit when the motor is energized. An additional variable resistance 74 is used to adjust the voltage across the Wheatstone bridge. Also shown are control panel terminals, as at 75, and motor-pump unit terminals, as at 76, interposed in the various wires, as shown, to facilitate cabling the electrical connections between the separated units.

The apparatus functions as follows: Normally, control switch button 43 will be in an intermediate "off" position. Moving button 43 upwardly to the "on" position actuates the motor and pump in the direction for drawing gas and vapor from the bilge compartment into the pump and forcing the same through tubing 18 to sensing unit housing 28, where it passes through filament housings 60 and 61 and thence is exhausted through port 38. The presence of combustible or contaminating gases or vapors in the bilge compartment will affect the resistances of one or both of the filaments 58 and 59 so as to unbalance the Wheatstone bridge, causing deflection of voltmeter-indicator 39a. Proper precaution and safety measures can then be taken. If it is desired to calibrate or "zero" the voltmeter, switch 43 is moved fully downwardly to the "check" position, which reverses the movement of the motor and air pump so as to draw clean air inwardly through port 38 and housing 28 and exhaust the same through tubing 18, 17 into the bilge compartment. Thus the apparatus will be flushed of contaminating matter. Button 42, actuating variable resistance 42a in the Wheatstone bridge, can then be adjusted to bring the voltmeter needle to the zero point. If, then, port 38 is exposed to fumes, as from an open cigarette lighter, the voltmeter needle, if the apparatus is properly functioning, will be seen to deflect.

The details of the gas detector unit may be varied and other types of such units may be incorporated in the system with suitable wiring therefor. Also, an audible or other type of indicator may be used in place of or in addition to the visible indicator 39a, 39. The use of the reversible motor-air pump set greatly simplifies the apparatus in that it permits the flushing and checking operation by the simple expedient of reversing the pump without the necessity of additional valves and piping. The invention may be modified in the respects indicated as well as others which will occur to those skilled in the art, and exclusive use of all such modifications as come within the scope of the appended claims is contemplated.

I claim:

1. Detecting apparatus for contaminant fluids comprising a contaminant fluid sensing device having a measuring indicator, means for mounting said device spaced from the zone to be monitored, a test port communicating with a second zone of known fluid characteristics, pump means, conduit means connecting said pump means to said sensing device and to the zone to be monitored for exposing said device to sample fluids from said last mentioned zone, and other conduit means connecting said device to said port for exposing said device to fluids in said second zone for checking said device and indicator.

2. Detecting apparatus for contaminant gases comprising a contaminant gas sensing device having an indicator including a gas sensitive resistance, a Wheatstone bridge including said resistance, a voltmeter connected across said bridge for measuring the unbalance thereof, and means for exciting said resistance, means to mount said device spaced from the zone to be monitored, a test duct communicating with a second zone, conduit means connecting said device with said zone and said duct, and a reversible gas pump interposed in said conduit means for selectively exposing said sensing device to sample gases from either the zone to be monitored or said second zone and exhausting into the other zone.

3. Combustible gas detecting apparatus comprising a catalytic detector filament, a casing therefor, means for supplying an essentially constant voltage to said filament, a gas pump, means for driving said pump, a gas conduit connecting said casing and said pump, a second gas conduit connecting said pump and the area to be monitored for combustible gases, a port communicating with an area of known gas characteristics, a third gas conduit connecting said port and said casing, means to reverse said pump for drawing gaseous matter into said casing, selectively, from said area or said port, warning means responsive to variations in the electrical characteristics of said catalytic detector filament, a Wheatstone bridge circuit including said filaments, and means to adjust one or more of the resistances in said bridge circuit for initially setting and checking the response of said sensing device.

References Cited in the file of this patent

UNITED STATES PATENTS

| | | |
|---|---|---|
| 2,618,150 | Willenborg | Nov. 18, 1952 |
| 2,637,019 | Piccolellis | Apr. 28, 1953 |
| 2,757,362 | Gutkowski | July 31, 1956 |
| 2,795,756 | Jacobson | June 11, 1957 |